United States Patent
Kim et al.

(10) Patent No.: US 7,541,390 B2
(45) Date of Patent: Jun. 2, 2009

(54) COMPOSITION FOR PREPARING ELECTRON EMITTER, ELECTRON EMITTER PRODUCED BY USING THE COMPOSITION, AND ELECTRON EMISSION DEVICE COMPRISING THE ELECTRON EMITTER

(75) Inventors: Chang-Wook Kim, Suwon-si (KR); Hyun-Jee Lee, Suwon-si (KR); Soo-Jin Park, Suwon-si (KR); Dong-Hyun Jung, Suwon-si (KR); Dae-Yup Shin, Suwon-si (KR); Seung-Hoon Choi, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 439 days.

(21) Appl. No.: 11/360,409

(22) Filed: Feb. 24, 2006

(65) Prior Publication Data
US 2006/0192227 A1  Aug. 31, 2006

(30) Foreign Application Priority Data
Feb. 28, 2005 (KR) .................... 10-2005-0016899

(51) Int. Cl.
*C08L 31/04* (2006.01)
*C08K 3/04* (2006.01)
*H01L 21/00* (2006.01)

(52) U.S. Cl. .................. 522/71; 522/153; 524/563; 524/564; 524/847; 977/742; 977/734; 977/753; 977/939; 430/319

(58) Field of Classification Search .................. 427/77; 428/690, 698; 522/71, 153; 524/563, 564, 524/847; 977/742, 734, 753, 939, 783, 785; 257/144; 430/319
See application file for complete search history.

(56) References Cited

U.S. PATENT DOCUMENTS

| | | | | | |
|---|---|---|---|---|---|
| 4,963,471 | A | * | 10/1990 | Trout et al. | 430/282.1 |
| 6,086,792 | A | * | 7/2000 | Reid et al. | 252/511 |
| 6,146,230 | A | * | 11/2000 | Kim et al. | 445/51 |
| 6,319,658 | B1 | * | 11/2001 | Lobo et al. | 430/434 |
| 6,455,771 | B1 | * | 9/2002 | Han et al. | 174/388 |
| 7,026,432 | B2 | * | 4/2006 | Charati et al. | 528/271 |
| 7,247,659 | B2 | * | 7/2007 | Kura et al. | 522/12 |
| 7,348,382 | B2 | * | 3/2008 | Ueno et al. | 526/87 |
| 7,390,970 | B2 | * | 6/2008 | Lee et al. | 174/102 SC |
| 2003/0062824 | A1 | * | 4/2003 | Moon | 313/495 |
| 2004/0068039 | A1 | * | 4/2004 | Lyoo et al. | 524/459 |
| 2006/0235132 | A1 | * | 10/2006 | Lyoo et al. | 524/460 |

FOREIGN PATENT DOCUMENTS
EP       0513889 A1 * 11/1992
KR   10-2003-0083790    11/2003

* cited by examiner

*Primary Examiner*—Susan W Berman
(74) *Attorney, Agent, or Firm*—H.C. Park & Associates, PLC

(57) ABSTRACT

A composition for preparing an electron emitter, an electron emitter produced by using the composition, and an electron emission device comprising the electron emitter are provided. The composition for preparing an electron emitter includes carbon-based materials and vehicles, wherein the vehicles comprise a polymer having a vinyl pivalate monomer. The composition for preparing an electron emitter improves a printing and a current-voltage characteristic simultaneously.

15 Claims, 1 Drawing Sheet

COMPOSITION FOR PREPARING ELECTRON EMITTER, ELECTRON EMITTER PRODUCED BY USING THE COMPOSITION, AND ELECTRON EMISSION DEVICE COMPRISING THE ELECTRON EMITTER

CROSS-REFERENCE TO RELATED APPLICATION

This application claims priority to and the benefit of Korean Patent Application No. 10-2005-0016899, filed on Feb. 28, 2005, in the Korean Intellectual Property Office, the disclosure of which is incorporated herein in its entirety by reference.

BACKGROUND OF THE INVENTION

1. Field of the Invention

The present invention relates to a composition for preparing an electron emitter, an electron emitter produced using the composition, and an electron emission device comprising the electron emitter. More specifically, the present invention relates to a composition for preparing an electron emitter comprising carbon-based materials and vehicles, wherein the vehicles comprise a polymer that has a vinyl pivalate monomer and the composition has improved printing characteristics and a current-voltage characteristics.

2. Description of the Background

Electron emission devices are display devices that emit electrons by applying a voltage between an anode and a cathode to form an electric field, and then bombarding the electrons onto a fluorescent material on an anode, thereby emitting light.

Carbon-based materials including carbon nanotubes that have excellent conductivity are expected to be ideal electron emitters since these materials have excellent conductivity and electric field focusing abilities, facilitate low voltage operation due to low work function, and have excellent electric field emission characteristics.

Previously, a composition for preparing an electron emitter comprising carbon nanotube powder, polymer, a vehicle containing an organic solvent, an inorganic binder, and other additives has been used to produce such electron emission device. For example, Korean Patent Application Laid Open No. 2003-0083790 discloses a carbon nanotube emitter paste composition for an electron emission display device comprising a carbon nanotube powder, a glass frit, an acrylate based resin, an ethyl cellulose, a photoinitiator, and an organic solvent.

As shown in the patent application, a composition for preparing an electron emitter mainly uses cellulose based or acrylate based polymers. If a cellulose based resin is used, the printability is excellent, but the current-voltage characteristics of the resulting electron emission device are not good. When an acrylate based resin is used, a current-voltage characteristic is excellent, but the printability degrades.

SUMMARY OF THE INVENTION

The present invention provides a composition for preparing an electron emitter comprising carbon-based materials and vehicles that comprise a polymer including a vinyl pivalate monomer. The resulting composition has improved printing and current-voltage properties.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
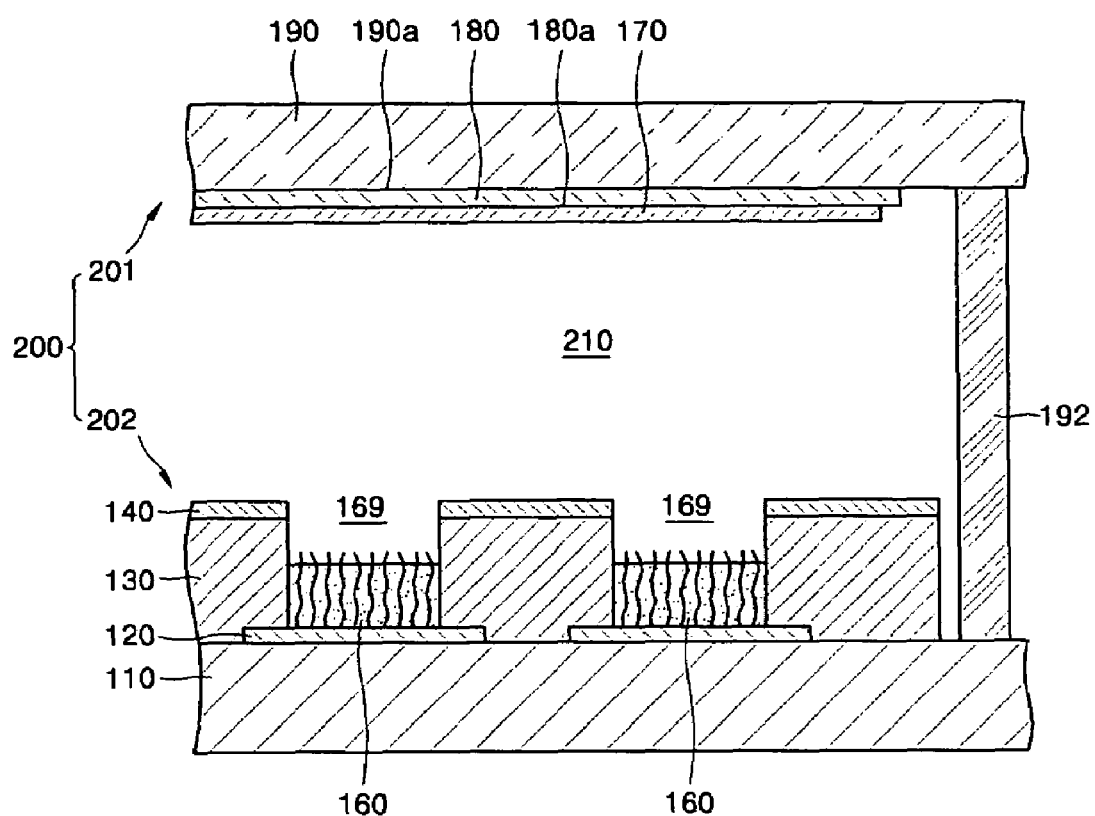
FIG. 1 shows an electron emission device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

The composition for preparing an electron emitter according to an exemplary embodiment of the present invention comprises carbon-based materials and vehicles. The composition has improved printing and current-voltage properties since the vehicle comprises a polymer including vinyl pivalate monomer. Also, by using the composition for preparing the electron emitter of the present invention, an electron emission device with improved operation properties may be mass-produced.

The carbon-based materials have excellent conductivity and electron emission properties, and emit electrons onto a fluorescent film of an anode portion and excite phosphors when operating an electron emission device. The carbon-based materials may include, but are not limited to carbon nanotubes, graphite, diamond, and fullerenes.

A carbon nanotube is a carbon allotrope in which a graphite sheet is rolled into a tube shape with a nano-size diameter. Both single wall and multiple wall nanotubes may be formed. Carbon nanotubes may be produced by a chemical vapor deposition method (CVD) such as thermal CVD, DC plasma CVD, RF plasma CVD, and microwave plasma CVD.

The vehicles in the composition of the present invention may control its viscosity and its printability. Design of the composition at a molecular level and a simulation in a cluster region play a very important role to produce the composition for preparing an electron emitter that satisfies the characteristics described above. Computer aided molecular design techniques analyze the physical and the chemical characteristics qualitatively and quantitatively. Thus, vehicles that comprise a polymer component that includes a vinyl pivalate monomer and an organic solvent satisfies the desired characteristics of the composition. The results of such design propose a polymer including the vinyl pivalate monomer of Formula 1 below.

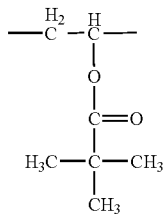

FORMULA 1

The vinyl pivalate monomer may be polymerized as a homopolymer unit or as a copolymer unit. A case in which the vinyl pivalate monomer of the present invention is used as a homopolymer unit and a case in which the vinyl pivalate monomer of the present invention is used as a copolymer unit will be described separately.

If the vinyl pivalate monomer is used as a homopolymer unit, the molecular weight of the polymer may be about 50,000 to about 300,000, and may be from about 100,000 to about 200,000. If the molecular weight of the polymer is less than 50,000, the viscosity of the composition is too low to form a film by printing. If the molecular weight is greater than 300,000, the viscosity of the composition is too high to provide excellent printability, and the electron emission device does not function well due to a large amount of residual coal after calcination.

When the vinyl pivalate monomer is used as a homopolymer unit, the homopolymer unit may be about 5 wt % to about 20 wt %, preferably about 10 wt % to about 15 wt % based on the total weight of the composition. If the concentration of the homopolymer unit is less than 5 wt % or greater than 20 wt %, similar problems to the case when the molecular weight is out of the prescribed range occur.

If a vinyl pivalate monomer is used as a homopolymer unit, the disadvantage is that a generic aqueous alkali solution (for example, a 2% $Na_2CO_3$ solution) may not be used after UV exposure of the composition for preparing an electron emitter. Instead, a hydrophobic solution such as acetone etc. may be used since the polymer does not contain any hydrophilic groups. Therefore, a hydrophilic group such as a carboxylic acid (—COOH) group etc. may be incorporated into the polymer in addition to vinyl pivalate monomer so that an aqueous alkali solution may be used for development.

A hydrophilic monomer that may be incorporated into the polymer may include, but is not limited to methacrylic acid or acrylic acid. The ratio of vinyl pivalate to a hydrophilic monomer in the copolymer may be between about 9:1 and about 5:5, and preferably between about 8:2 and about 6:4. If the concentration of the vinyl pivalate is higher than the given ranges, it becomes difficult to develop the copolymer due to insufficiency of hydrophilic groups. If the concentration of the vinyl pivalate is lower than the given ranges, it becomes difficult to develop the copolymer and the amount of residual coal after calcination increases, which is not preferable.

When the vinyl pivalate monomer is used as a copolymer unit, the molecular weight of the copolymer may be about 50,000 to about 300,000, preferably about 100,000 to about 200,000. The copolymer unit may be about 5 wt % to about 20 wt % and preferably about 10 wt % to about 15 wt % based on the total weight of the composition.

The vehicles in the composition of the present invention may comprise organic solvents that are commonly used in the art. For example, the organic solvent may include, but is not limited to butyl carbitol acetate (BCA), terpineol (TP), toluene, texanol, or butyl carbitol (BC), etc.

The composition of the present invention may further comprise at least one additive selected from the group consisting of a binder, a filler, a photosensitive resin, a photoinitiator, a leveling improver, a viscosity improver, a resolution improver, a dispersing agent, and an anti-foaming agent.

An adhesive component increases the adhesive force between carbon nanotubes and a substrate, and may include an inorganic adhesive component, an organic adhesive component, and a low melting metal, for example.

A filler increases the conductivity of the carbon nanotubes that do not adhere to a substrate sufficiently, and may include Ag, Al, and Pd, but is not limiting to these.

A photosensitive resin may be used to pattern an electron emitter, and specific examples may include but are not limited to a thermally liable acrylate-based monomer, a benzophenone-based monomer, an acetophenone-based monomer, and a thiochixanthone-based monomer. In particular, epoxy acrylate, polyester acrylate, 2,4-diethyloxanthone, and 2,2-dimethoxy-2-phenylacetophenone may be used.

A photoinitiator initiates cross-linking of a photosensitive resin upon exposure of the resin. For example, the photoinitiator may be benzophenone etc.

A leveling improver may decrease the surface tension of the printed carbon nanotube layer, thereby improving the leveling properties of the composition. An electron emitter with improved leveling properties may have a longer lifespan since the electron emitter has excellent light emission consistency and a constant electric field may be applied to the electron emitter.

The composition of the present invention may further comprise a viscosity improver, a resolution improver, a dispersing agent, and an anti-foaming agent, for example.

Another embodiment of the present invention provides an electron emitter that is fabricated using the composition for preparing an electron emitter.

A process for preparing an electron emitter using the composition for preparing an electron emitter as described above includes preparing a composition including carbon-based materials and vehicles, printing the composition on a substrate, calcinating the printed composition, and activating the calcinated product to obtain an electron emitter.

A composition for preparing an electron emitter is prepared by mixing carbon-based materials and vehicles as described above. Before printing, the viscosity of the composition may be about 3,000 cps to about 50,000 cps, and preferably from about 5,000 cps to about 30,000 cps.

Then, the composition is printed on a substrate. As used herein, "substrate" refers to any material on which an electron emitter may be formed. It may include various types of materials depending on the electron emission device to be formed and is well known to the one skilled in the art.

The printing method differs depending on whether or not the composition comprises a photosensitive resin. If the composition comprises a photosensitive resin, it is not necessary to form a separate photoresist pattern. That is, the composition comprising a photosensitive resin is printed onto a substrate, and is exposed and developed depending on a desired electron emitter forming portion.

If the composition does not comprise a photosensitive resin, a separate photoresist film pattern may be required. In that case, a photoresist film pattern is formed using a photoresist film, and then the composition is printed on it.

As described above, the calcination process may improve the adhesion between the carbon-based materials and the substrate in the printed composition for preparing an electron emitter. In addition, it may improve the electron emitter's durability, etc. by melting and solidifying at least a portion of adhesive components, and it minimizes outgasing. The calcination temperature may be determined based on the vaporization of the vehicles in the composition, and the temperature and time that is required to calcinate the adhesive components. Common calcination temperatures are about 400° C. to about 500° C., preferably about 450° C. If the calcination temperature is lower than 400° C., the vehicles may not vaporize sufficiently. If the calcination temperature is greater than 500° C., the carbon-based materials may be damaged.

The carbon-based materials that are present on the surface of such calcinated products then undergo an activation process. The activation may be carried out by applying a solution that can be cured on the film by heat treatment. For example, an electron emitter surface treating agent comprising a polyimide based polymer is formed on the calcinated product, then it is heat treated and the film that is formed by heat treatment is released. The activation process may also be carried out by forming an adhesive portion on a surface of a roller and applying a desired pressure to the surface of the calcinated product with the roller. With these activation processes, carbon-based materials may be exposed to the surface of the electron emitter and the vertical orientation may be controlled.

The present invention also provides an electron emission device that includes a substrate, a cathode formed on the substrate, and an electron emitter that is coupled with the cathode.

FIG. 1 is partial cross sectional view of the electron emitter according to the present invention, and depicts the electron emitter with a triode structure.

As illustrated in FIG. 1, the electron emission device 200 is provided with a top plate 201 and a bottom plate 202. The top plate includes a top substrate 190, an anode 180 disposed on the bottom surface 190a of the top substrate 190, and a phosphor layer 170 disposed on the bottom surface 180a of the anode 180.

The bottom plate 202 includes a bottom substrate 110 disposed at a distance opposite and parallel to the top plate 190, a cathode 120 disposed in the form of a stripe on the bottom substrate 110, a gate electrode 140 disposed in the form of stripe to cross over the cathode 140 and an insulator layer 130 disposed between the gate electrode 140 and the cathode 120. In addition, an electron emitter hole 169 is formed in the insulator layer 130 at a portion of the gate electrode 140. An electron emitter 160 is disposed in the electron emitter hole 169 to be coupled with the cathode 120 at a lower height than the gate electrode 140.

The top plate 201 and the bottom plate 202 are maintained under a vacuum that is lower than atmospheric pressure. The spacer 192 is disposed between the top plate 201 and the bottom plate 202 such that the pressure between the top plate 201 and the bottom plate 202 created from the vacuum is supported and the light emission space 210 is formed.

The anode 180 applies a voltage to accelerate the electrons that are emitted from the electron emitter 160 so that they bombard the phosphor layer 170 at a high velocity. The phosphor layer 170 is excited by the electrons and emits visible light when the electrons drop from a high energy level to lower energy level.

For a color electron emission device, a plurality of the light emission spaces 210 that constitute each unit pixel, phosphor layers 170 comprising a red light emission material, a green light emission material, and a blue light emission material are disposed on the bottom surface 180a of the anode.

The gate electrode 140 facilitates the emission of electrons from the electron emitter 160, and the insulator layer 130 forms the electron emitter holes 169 and insulates the electron emitter 160 and the gate electrode 140.

The present invention will be described in greater detail with reference to the following examples. The following examples are for illustrative purposes and are not intended to limit the scope of the invention.

EXAMPLE 1

10 g of terpineol were combined with 1 g of carbon nanotube powder (Iljin Nanotech Co., Ltd.), 0.2 g of frit (Shinceramic Co., Ltd.), 2 g of polyvinyl pivalate, and 5 g of benzophenone. After stirring, a composition in which a vinyl pivalate monomer is used as a homopolymer unit with a viscosity of 30,000 cps was formed. The composition for preparing an electron emitter was printed on a substrate that was provided with a Cr gate electrode, an insulating film, and an ITO electrode. Then, the printed substrate was irradiated using a pattern mask and a parallel exposure with 2000 mJ/cm$^2$ of exposure energy. After exposure, spraying for development and calcination at 450° C. were performed to produce the electron emitter. A surface of a roller with an adhesive portion was attached to the resulting electron emitter, and released from the electron emitter after pressurization to activate the final electron emitter. Then, a substrate with an ITO anode and a fluorescent film was disposed opposite the substrate that the electron emitter was formed on, and a spacer was formed between the substrates to maintain cell gap between the substrates, thereby producing the electron emission device of the present invention.

EXAMPLE 2

10 g of terpineol were combined with 1 g of carbon nanotube powder (Iljin Nanotech Co., Ltd.), 0.2 g of frit (Shinceramic Co., Ltd.), 2 g of poly (vinyl pivalate-co-methacrylic acid) (vinyl pivalate:methacrylic acid monomer=7:3), and 5 g of benzophenone. After stirring, a composition in which a vinyl pivalate monomer is used as a copolymer unit with a viscosity of 30,000 cps was formed. The composition for preparing an electron emitter was printed on a substrate that was provided with a Cr gate electrode, an insulating film, and an ITO electrode. Then, the printed substrate was irradiated using a pattern mask and a parallel exposure with 2000 mJ/cm$^2$ of exposure energy. After exposure, spraying for development and calcination 450° C. were performed to produce the electron emitter. A surface of a roller with an adhesive portion was attached to the resulting electron emitter, and released from the electron emitter after pressurization, to activate the final electron emitter. Then, a substrate with an ITO anode and a fluorescent film was disposed opposite the substrate that the electron emitter was formed on, and a spacer was formed between the substrates to maintain cell gap between the substrates, thereby producing the electron emission device of the present invention.

COMPARATIVE EXAMPLE 1

An electron emission device was produced according to components and concentrations described in EXAMPLE 1, except that a polyacrylate was used as a polymer component in vehicles.

COMPARATIVE EXAMPLE 2

An electron emission device was produced according to components and concentrations described in EXAMPLE 1, except that cellulose was used as a polymer component in vehicles.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A composition for preparing an electron emitter, comprising:
    a conductive carbon-based material; and
    a vehicle,
    wherein the vehicle comprises a polymer that includes a vinyl pivalate monomer, and
    wherein the polymer is a homopolymer.
2. The composition of claim 1,
    wherein the molecular weight of the polymer is in the range of 50,000 to 300,000.
3. The composition of claim 1,
    wherein the molecular weight of the polymer is in the range of 100,000 to 200,000.
4. The composition of claim 1,
    wherein the concentration of the polymer is in the range of 5 wt % to 20 wt % based on the total weight of the composition.
5. The composition of claim 1,
    wherein the concentration of the polymer is in the range of 10 wt % to 15 wt % based on the total weight of the composition.
6. The composition of claim 1, further comprising:
    at least one additive selected from the group consisting of a binder, a filler, a photosensitive resin, a photoinitiator, a leveling improver, a viscosity improver, a resolution improver, a dispersing agent and an anti-foaming agent.
7. A composition for preparing an electron emitter, comprising:
    a conductive carbon-based material; and
    a vehicle,
    wherein the vehicle comprises a polymer that includes a vinyl pivalate monomer, and
    wherein the polymer is a copolymer of a vinyl pivalate monomer and a hydrophilic monomer.
8. The composition of claim 7,
    wherein the hydrophilic monomer is methacrylic acid or acrylic acid.
9. The composition of claim 7,
    wherein the ratio of the vinyl pivalate monomer to the hydrophilic monomer in the copolymer is in the range of 9:1 to 5:5.
10. The composition of claim 7,
    wherein the ratio of the vinyl pivalate monomer to the hydrophilic monomer in the copolymer is in the range of 8:2 to 6:4.
11. The composition of claim 7,
    wherein the molecular weight of the polymer is in the range of 50,000 to 300,000.
12. The composition of claim 7,
    wherein the molecular weight of the polymer is in the range of 100,000 to 200,000.
13. The composition of claim 7,
    wherein the concentration of the polymer is in the range of 5 wt % to 20 wt % based on the total weight of the composition.
14. The composition of claim 7,
    wherein the concentration of the polymer is in the range of 10 wt % to 15 wt % based on the total weight of the composition.
15. The composition of claim 7, further comprising:
    at least one additive selected from the group consisting of a binder, a filler, a photosensitive resin, a photoinitiator, a leveling improver, a viscosity improver, a resolution improver, a dispersing agent and an anti-foaming agent.

* * * * *